US011897354B2

(12) United States Patent
Soroky et al.

(10) Patent No.: US 11,897,354 B2
(45) Date of Patent: Feb. 13, 2024

(54) STANDARD PROVISIONING FOR EV CHARGING CENTER

(71) Applicant: Ullman Electric & Technologies Company, Cleveland, OH (US)

(72) Inventors: Phillip Soroky, Chagrin Falls, OH (US); Thomas Grabowski, Brunswick, OH (US); Michael Roach, Olmsted Falls, OH (US)

(73) Assignee: ULLMAN ELECTRIC & TECHNOLOGIES COMPANY, Cleveland, OH (US)

( * ) Notice: Subject to any disclaimer, the term of this patent is extended or adjusted under 35 U.S.C. 154(b) by 507 days.

(21) Appl. No.: 17/186,947

(22) Filed: Feb. 26, 2021

(65) Prior Publication Data

US 2022/0274495 A1 Sep. 1, 2022

(51) Int. Cl.
*B60L 53/31* (2019.01)
*H02G 3/08* (2006.01)
*B60L 53/30* (2019.01)

(52) U.S. Cl.
CPC ............. *B60L 53/31* (2019.02); *B60L 53/305* (2019.02); *H02G 3/08* (2013.01)

(58) Field of Classification Search
CPC ........ B60L 53/30; B60L 53/31; B60L 53/305; B60L 53/66; B60L 53/67; H02G 3/08
See application file for complete search history.

(56) References Cited

U.S. PATENT DOCUMENTS

| 2019/0152335 A1* | 5/2019 | Färber | ..................... B60L 53/30 |
| 2019/0267822 A1* | 8/2019 | Waffner | ................. H05K 7/209 |
| 2020/0328604 A1* | 10/2020 | Molle | ..................... B60L 53/30 |

\* cited by examiner

*Primary Examiner* — Richard Isla
*Assistant Examiner* — Johali A Torres Ruiz
(74) *Attorney, Agent, or Firm* — Emerson, Thomson & Bennett LLC; Roger D. Emerson (57) ABSTRACT

Provided in this disclosure is a standardized provisioning for an electrical vehicle charging station. A center pad is configured to be moved and placed on a horizontal surface at a desired location. A central junction box is formed in the center pad for receiving a power conduit stub-up and a communications conduit stub-up. The power and communications conduit stub-ups extend vertically above the horizontal surface. A plurality of outer junction boxes are formed in the center pad, each configured to provide a power connection and a communication connection to a respective plurality of electrical charging dispensers. A plurality of raceways extend through the center pad from the central junction box to each of the respective outer junction boxes to provide passageways for the power and communications connections between the stub-ups and the plurality of electrical charging dispensers.

20 Claims, 6 Drawing Sheets

STANDARD PROVISIONING FOR EV CHARGING CENTER

I. BACKGROUND

A. Technical Field

The present invention pertains to the field of delivering or dispensing power for electric vehicles (EV power delivery). The present invention particularly pertains to the field of self-service EV power delivery centers in which a vehicle driver can charge a vehicle using an external power supply.

B. Description of Related Art

Electric vehicles are increasing in popularity among vehicle drivers. Consequently, EV delivery centers are being installed where vehicle drivers can charge their vehicles. There are important differences between dispensing electricity and fossil fuels which are to be considered in the design of EV delivery centers.

In conventional fossil fuel dispensing (i.e., at a gas station for filling the vehicle with gasoline or diesel fuel), it is sufficient to have a pump alongside the vehicle at ground level, where the vehicle driver faces a pump with a display and inserts a nozzle into the vehicle. In an EV delivery operation, a "pistol grip" electric charger on the dispenser is engaged with a port on the vehicle. However, since electricity is dispensed instead of liquid fuel, it can be undesirable to locate an EV charger at ground level, in the event the driver might be standing in water on the ground or during rain. Also in the interest of electrical safety, it would be undesirable to have the driver located directly between the vehicle and the charger during an EV dispensing operation.

The provisioning of new EV delivery centers has resulted in certain problems. There are different vendors of EV charging dispensers including Siemens, Charge Point and BTC. On-site installation is typically performed by local contractors each using a different approach for each different dispenser sold by each different vendor. Dispensers include an AC level 2 for an individual dispenser, a DC fast charge level 3 dispenser, or a distribution module that delivers AC power from a "master" unit and distributes to one or more "slave" units. It is not uncommon that a provisioning installed for one type of dispenser might be unsuitable for another type of dispenser, which might entail ripping out and/or repurposing existing provisioning, resulting in considerable time, work and expense to install suitable provisioning.

Additionally, a typical electrical installation can entail ad hoc, tailor-made electrical components including exposed junction boxes and raceways that are surface mounted and exposed to the elements. This can result in a potential trip hazard for personnel during installation, and an ongoing trip hazard for vehicle drivers during operation of the EV charging delivery center.

A typical EV delivery center is contracted as a "build to suit" facility in which a developer agrees install a design standard set by the client to fit a predetermined electrical configuration for a predetermined budget used to set the client's rent structure for receiving a vendor's EV charging dispensers. The facility must be available for operation by a fixed launch date. The various aspects of installing a unique ad hoc, tailor-made provisioning at each installation site can create delays which can jeopardize EV readiness by the fixed launch date.

A typical EV charging dispenser includes a ferrous metallic housing with a powder coating applied thereto. When supported directly upon a concrete surface, the housing is found to rust, even shortly after installation of a new unit. This rusting may be due to moisture in contact with the concrete and/or outgassing of water from the concrete material and/or some other chemical reaction of the concrete material with the ferrous material.

II. SUMMARY

Provided in this disclosure is a standardized provisioning for an electrical vehicle charging station. A center pad, preferably formed of precast concrete, is configured to be moved and placed at a desired location, preferably a vehicle parking lot for electric vehicles. In the preferred embodiment, the center pad is a rectangular pad and includes a top surface, a bottom surface, first and second side surfaces and first and second end surfaces.

The present center pad is configured to cooperate with a power conduit stub-up and a communications conduit stub-up that extend vertically through an opening in the vehicle parking lot. These power and communications conduit stub-ups are installed underground, underneath the vehicle parking lot, and are located at the desired location. The stub-ups are respectively connected to power and communications lines placed underneath the vehicle parking lot.

A central junction box is formed as a rectangular aperture in the center pad extending between the top surface and the bottom surface. The central junction box receives the power and communications conduit stub-ups through the opening in the vehicle parking lot. The central junction box includes a divider plate for dividing the power conduit stub-up and associated power connections from the communications conduit stub-up and associated communications connections. A non-metallic, nonconductive cover plate is received atop the central junction box for sealing the central junction box from the elements and to minimize the potential for ground passage thru surfaces that do not have an equal potential to ground.

A plurality of outer junction boxes includes a first set of rectangular apertures formed in the center pad and located substantially proximate to the first end surface. The plurality of outer junction boxes also includes a second set of rectangular apertures formed in the center pad and located substantially proximate to the second end surface. Each of the outer junction boxes is configured to provide a power connection and a communication connection to a respective electrical charging dispenser.

A plurality of raceways extend through the center pad from the central junction box to each of the respective outer junction boxes to provide passageways for the power and communications connections between the stub-ups and the plurality of electrical charging dispensers. A plurality of isolating plates are provided, each respectively set atop one of the outer junction boxes to provide electrical and corrosion isolation between the center pad and the respective electrical charging dispensers.

According to an aspect, the present invention ensures standard provisioning usable for each aspect of design an EV delivery center.

According to another aspect, the present invention provides enhanced electrical safety by elevating the charger above ground level and locating the driver on a safe clear area perpendicular to the van loading lanes instead of being positioned between the vehicle's bumper or wheel stop and the charger during an EV dispensing operation.

According to another aspect, the present invention reduces trip hazards and twisting sprains associated with the removal of the dispensing handle and providing credentials to the controller by providing a clear/safe working platform.

According to still another aspect, the present invention provides a standard provisioning that can be used with different types of EV charging dispensers manufactured by different vendors.

According to yet another aspect, the present invention provides a standard provisioning that can standardize installation and avoid removing and/or repurposing existing provisioning and conserve the time, work and expense entailed in installing suitable provisioning.

According to a further aspect, the present invention avoids ad hoc electrical installations that use tailor-made electrical components that are exposed to the elements and can result in a potential trip hazard for personnel during and after installation.

According to another further aspect, the present invention provides a standardized installation that enables a facility developer to provide a predetermined electrical configuration for a predetermined budget and available for operation by a fixed launch date, avoiding cost overruns and readiness delays.

According to still another further aspect, the present invention prevents rusting of an EV charging dispenser when supported directly upon a concrete surface.

Other benefits and advantages of this invention will become apparent to those skilled in the art to which it pertains upon reading and understanding of the following detailed specification.

III. BRIEF DESCRIPTION OF THE DRAWINGS

The disclosed standard provisioning may take physical form in certain parts and arrangement of parts, embodiments of which will be described in detail in this specification and illustrated in the accompanying drawings which form a part hereof and wherein.

IV. DETAILED DESCRIPTION

Reference is now made to the drawings wherein the showings are for purposes of illustrating embodiments of the article only and not for purposes of limiting the same, and wherein like reference numerals are understood to refer to like components.

Figure 1A:
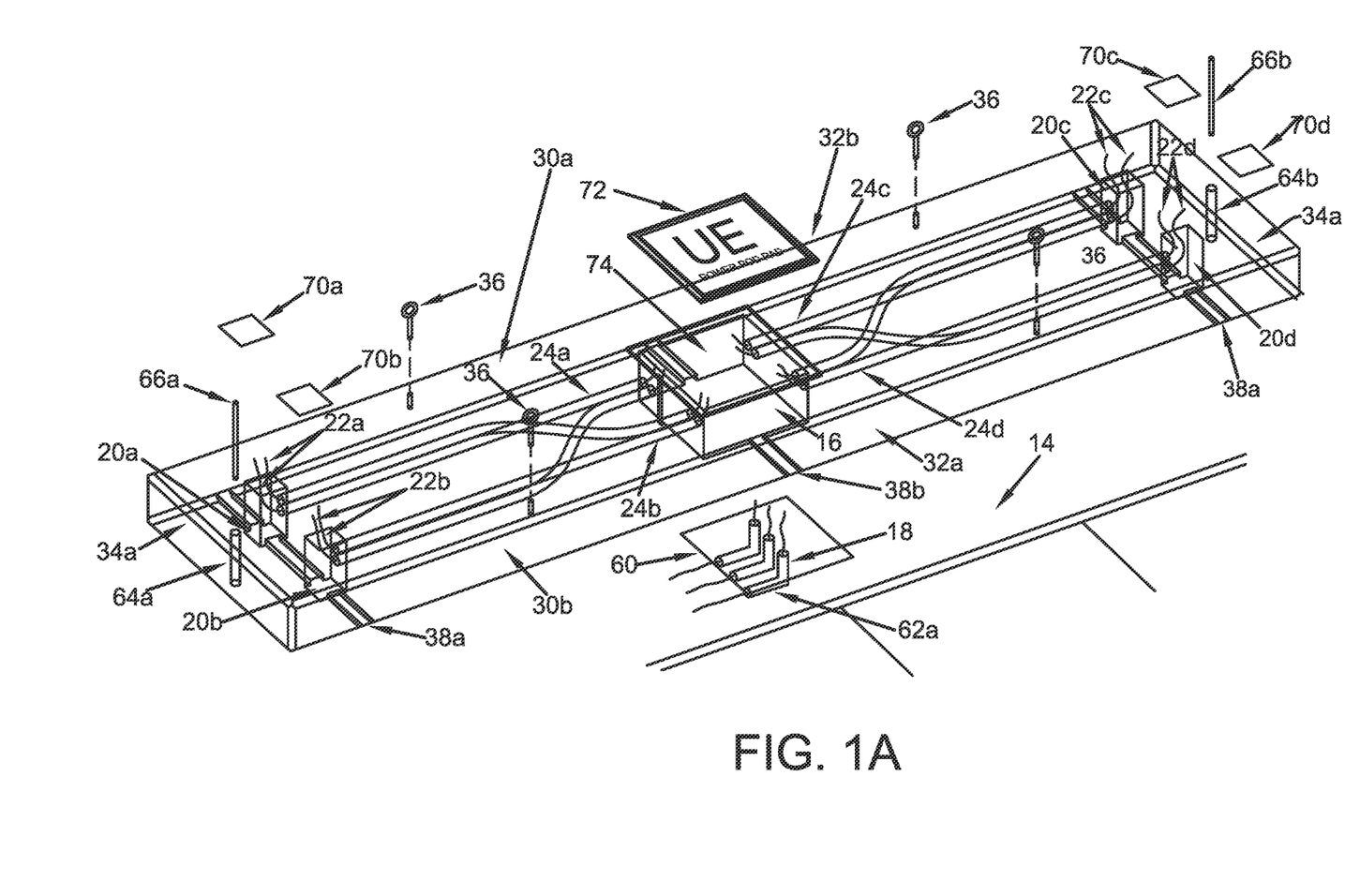
FIGS. 1A, 1B, 1C, and 1D are respectively exploded perspective, top, end and side views shown in phantom of the standard provisioning in accordance with an exemplary embodiment of the present invention.
Figure 1B:
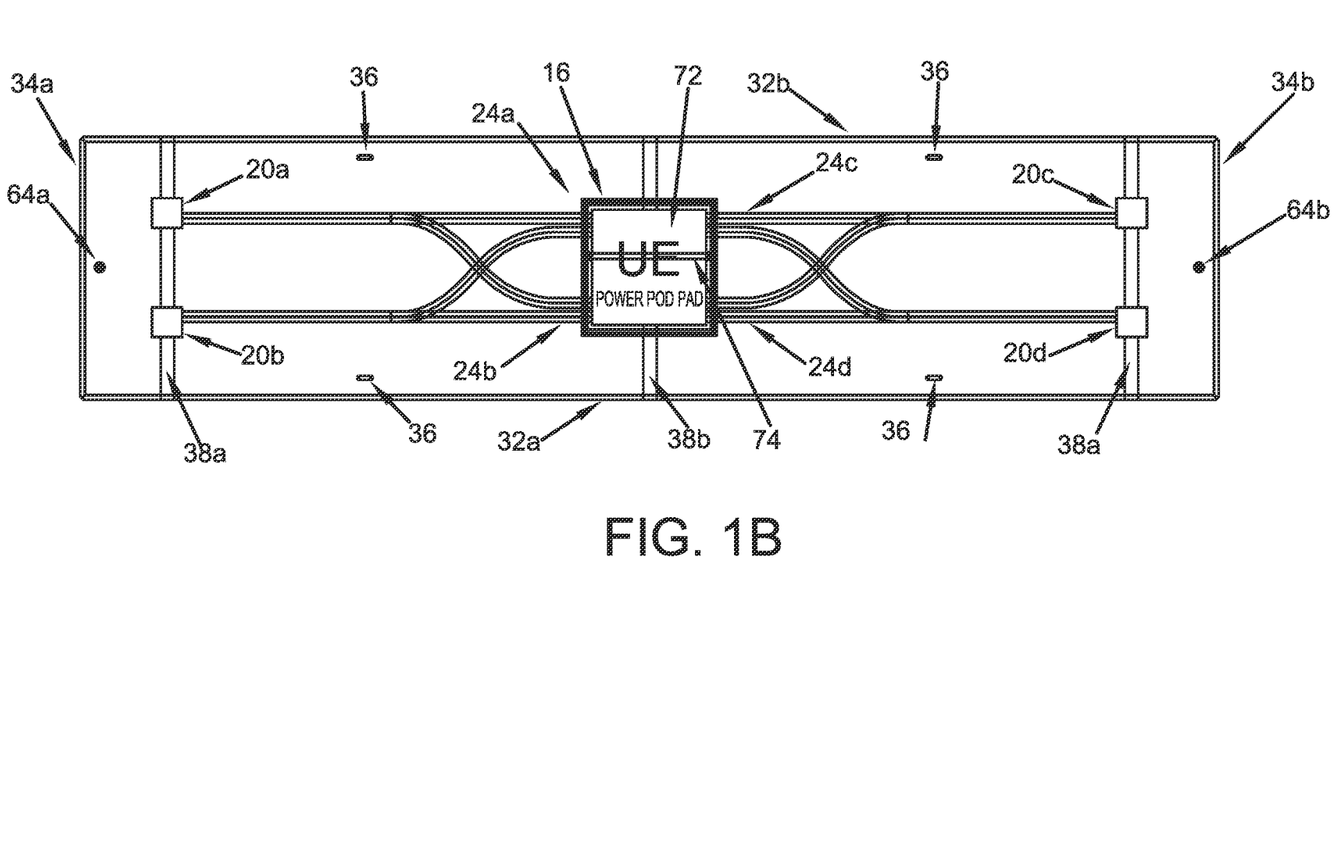
Figures 1C, 1D:
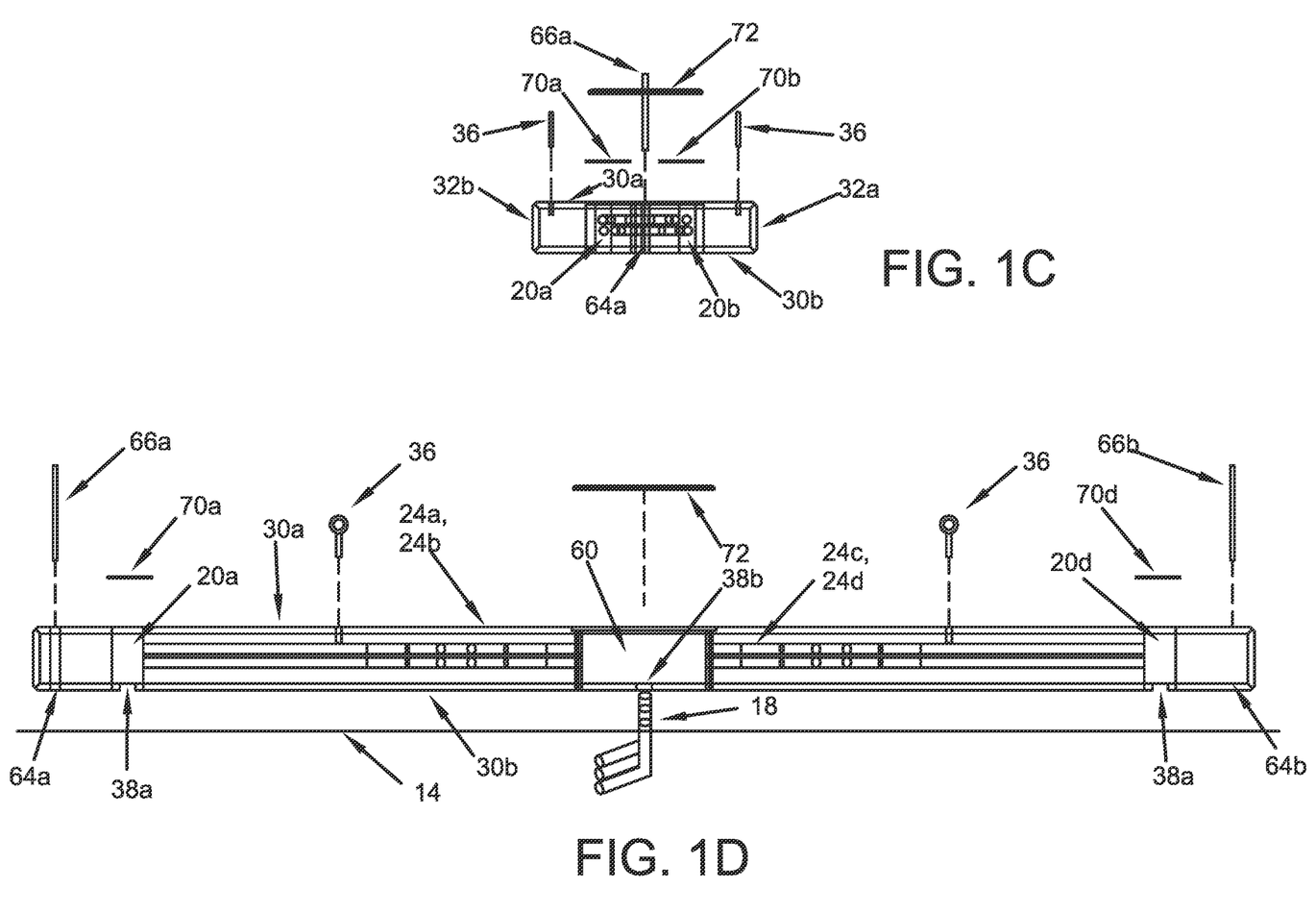

With reference to FIGS. 1A, 1B, 1C and 1D, a standardized provisioning 10 for an electrical vehicle charging station is shown. To avoid the problems as explained hereinabove, the standardized provisioning 10 provides a "rough-in" pre-provisioned pad that enables service personnel to install switches, transformers and related components while readily pulling wires that can connect to the components. In this manner, EV charging stations can be provisioned in a standard, repeatable, modular design that can be deployed in small installations or readily upscaled for large installations.

As shown in FIGS. 1A, 1B, 1C and 1D, the standard provisioning 10 includes a center pad 12 configured to be moved and placed on a horizontal surface 14 at a desired location. In the preferred embodiment, the center pad 12 is a substantially flat and elongated member, and of a generally rectangular configuration. A central junction box 16 is formed in the center pad 12, preferably at a generally central location along the length of the center pad 16. The center pad 12 is placed on the horizontal surface 14 so that the central junction box 16 is open to receive stub-ups 18, which include a power conduit stub-up and a communications conduit stub-up. These power and communications conduit stub-ups 18 extend vertically upward above the plane of the horizontal surface 14.

With further reference to FIGS. 1A, 1B, 1C and 1D, a plurality of outer junction boxes 20a, 20b, 20c, 20d are formed in the center pad 12, preferably at respective opposite ends of the center pad 12, displaced from the central junction box 16. Each of the outer junction boxes 20a, 20b, 20c, 20d are configured to provide connections 22a, 22b, 22c, 22d including a power connection and a separate communication connection to a respective plurality of electrical charging dispensers, as will be explained hereinbelow.

With continuing reference to FIGS. 1A, 1B, 1C and 1D, a plurality of raceways 24a, 24b, 24c, 24d extend through the center pad 12 from the central junction box 16 to each of the respective outer junction boxes 20a, 20b, 20c, 20d to provide passageways for the power and communications connections 22a, 22b, 22c, 22d between the stub-ups 18 and the plurality of electrical charging dispensers. The raceways 24a, 24b, 24c, 24d are preferably formed of a conduit, preferably formed of Electrical Non-Metallic Tubing (ENT), which can be one inch in diameter, through which standard electrical and communications cables are pulled to create the power and communications connections 22a, 22b, 22c, 22d between the stub-ups 18 and the plurality of electrical charging dispensers. The raceways 24a, 24b, 24c, 24d are preferably formed into a desired shape in a preliminary process and subsequently embedded into the solid body of the center pad 12. The raceways 24a, 24b, 24c, 24d can be further dimensioned for potential future replacement of electrical communication cables with fiber optic cables, and will not have sharp bends. This future replacement can enable the installation of other services such as WiFi, digital signage, paging, background music, or any other suitable service.

As is evident from the exemplary embodiment of FIGS. 1A, 1B, 1C and 1D, the center pad 12 is preferably a rectangular pad that includes a top surface 30a, a bottom surface 30b, first and second side surfaces 32a, 32b and first and second end surfaces 34a, 34b. The top surface 30a is a vertically upwardly extending surface while the bottom surface 30b is a vertically downwardly extending surface that contacts the horizontal surface 14. The side surfaces 32a, 32b extend along the longitudinal length of the elongated, rectangular shape. The end surfaces 34a, 34b are at respective opposite longitudinal ends of the elongated, rectangular shape. Various components are positioned and located with respect to these surfaces, as explained hereinbelow.

With continuing reference to FIGS. 1A, 1B, 1C and 1D, the center pad 12 is preferably formed of precast concrete. However, it should be considered that the center pad 12 could be formed of any suitable material such as recycled plastic material without departing from the invention. As indicated in the figures, the edges of the center pad 12 are formed with a bevel in order to prevent chipping. The raceways 24a, 24b, 24c, 24d are held inside a mold over which the precast concrete is poured so that the center pad 12 forms around the raceways 24a, 24b, 24c, 24d. Moreover, the outer junction boxes 20a, 20b, 20c, 20d and the central junction box 16 can be fashioned by suitably shaped forms in the mold that result in void spaces.

As also shown in FIGS. 1A, 1B, 1C and 1D, the precast concrete center pad 12 also includes a plurality of removable eyelet anchors 36 which are received in suitable threaded members embedded inside the center pad 12. These eyelet anchors 36 are attached to cables connected to a winch system for lifting the center pad 12 and for subsequently for moving and placing the precast concrete center pad 12 at the desired location. Upon removal, the threaded members that receive the eyelet anchors 36 can be filled with silicone sealer to prevent the entry of moisture, or can alternatively receive a removable plug in the event that the eyelet anchors 36 ever need to be reinserted for subsequent moving and repositioning of the center pad 12.

As also shown in FIGS. 1A, 1B, 1C and 1D, the central junction box 16 and the outer junction boxes 20a, 20b, 20c, 20d are preferably formed as void spaces in the shape of rectangular apertures formed in the center pad 12 which extend between the top surface 30a and the bottom surface 30b. In this manner, the central junction box 16 the outer junction boxes 20a, 20b, 20c, 20d are fully open so that they can drain any water that might condense or collect therein, providing a dry area for retaining the power and communication conduit connections 22a, 22b, 22c, 22d.

As also shown in FIGS. 1A, 1B, 1C and 1D, the rectangular apertures of the outer junction boxes 20a, 20b, 20c, 20d each also include a drainage channel 38a formed on the bottom surface 30b of the center pad 12 and extending between the first and second side surfaces 32a, 32b. As shown, each drainage channel 38a can run underneath two of the outer junction boxes 20a, 20b, 20c, 20d. Another drainage channel 38b runs underneath the central junction box 16, also formed on the bottom surface 30b of the center pad 12 and extending between the first and second side surfaces 32a, 32b. In this manner, the drainage channels 38a, 38b enable any accumulated water to flow out onto the horizontal surface 14.

Figure 2:
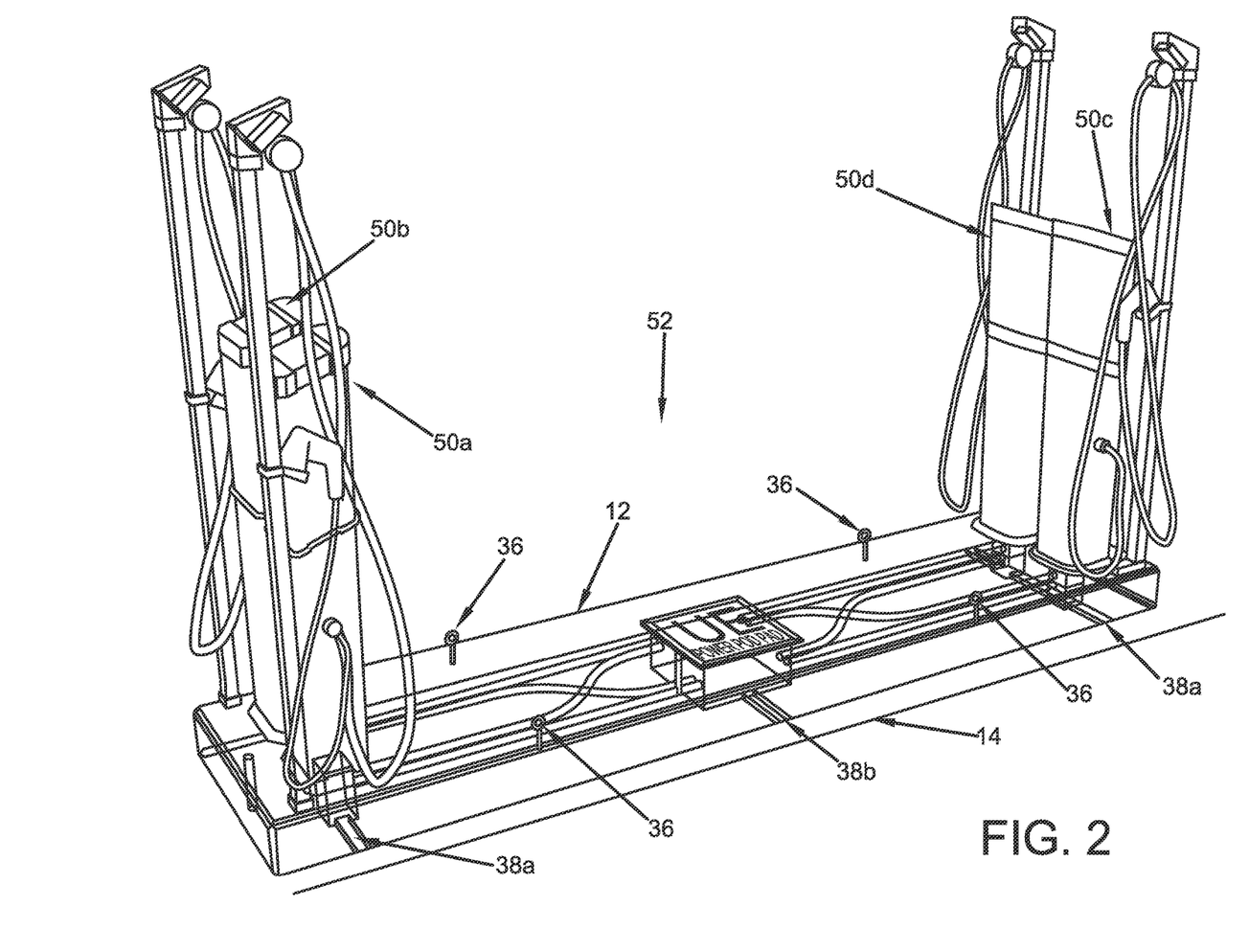
FIG. 2 is a perspective view showing a standard provisioning of a center pad and EV dispensers in accordance with an exemplary embodiment of the present invention.
Figure 3A:
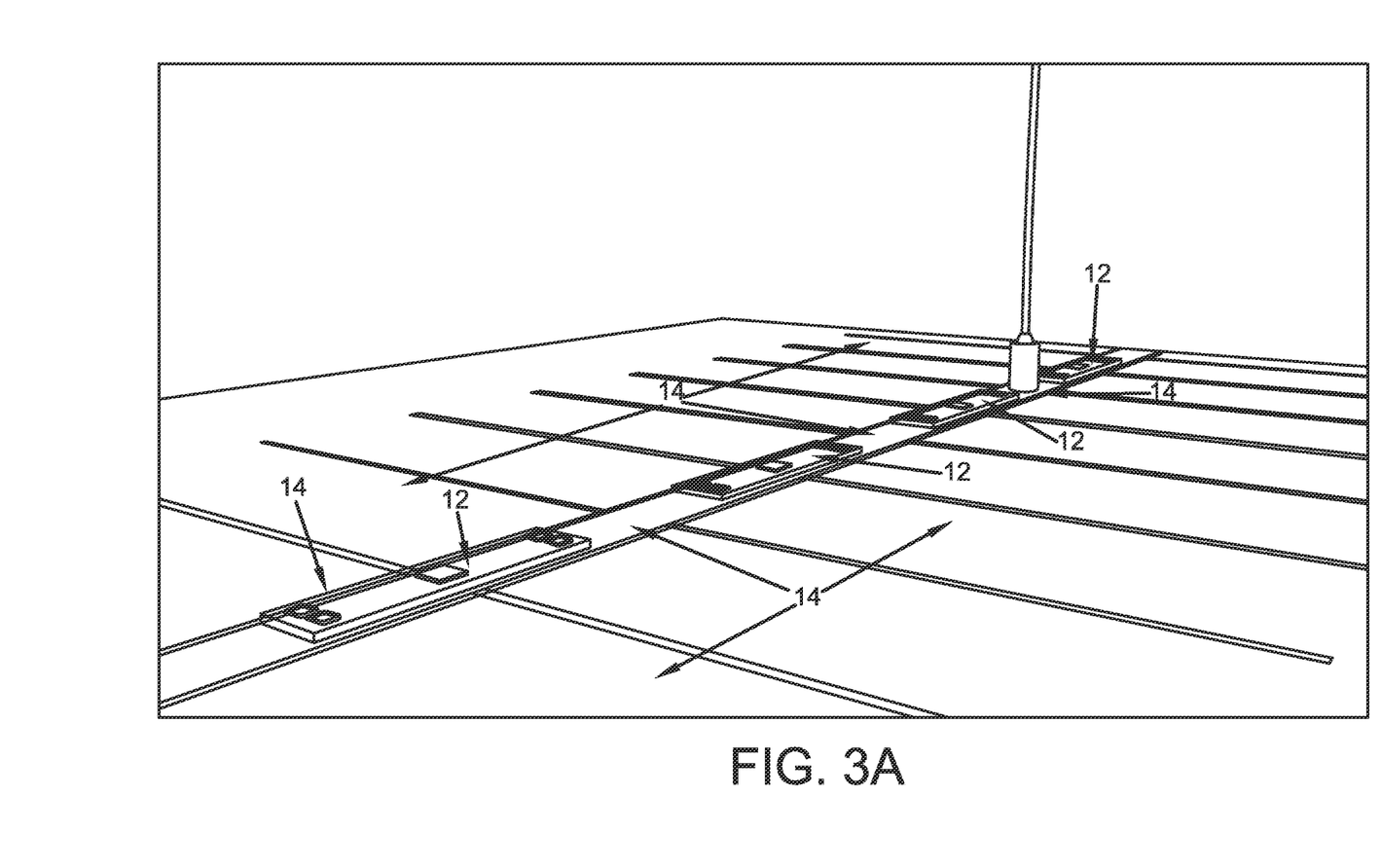
FIGS. 3A and 3B are perspective views of a self-service EV power delivery center incorporating a standard provisioning of plurality of center pads alone and with respective EV dispensers in accordance with an exemplary embodiment of the present invention.
Figure 3B:
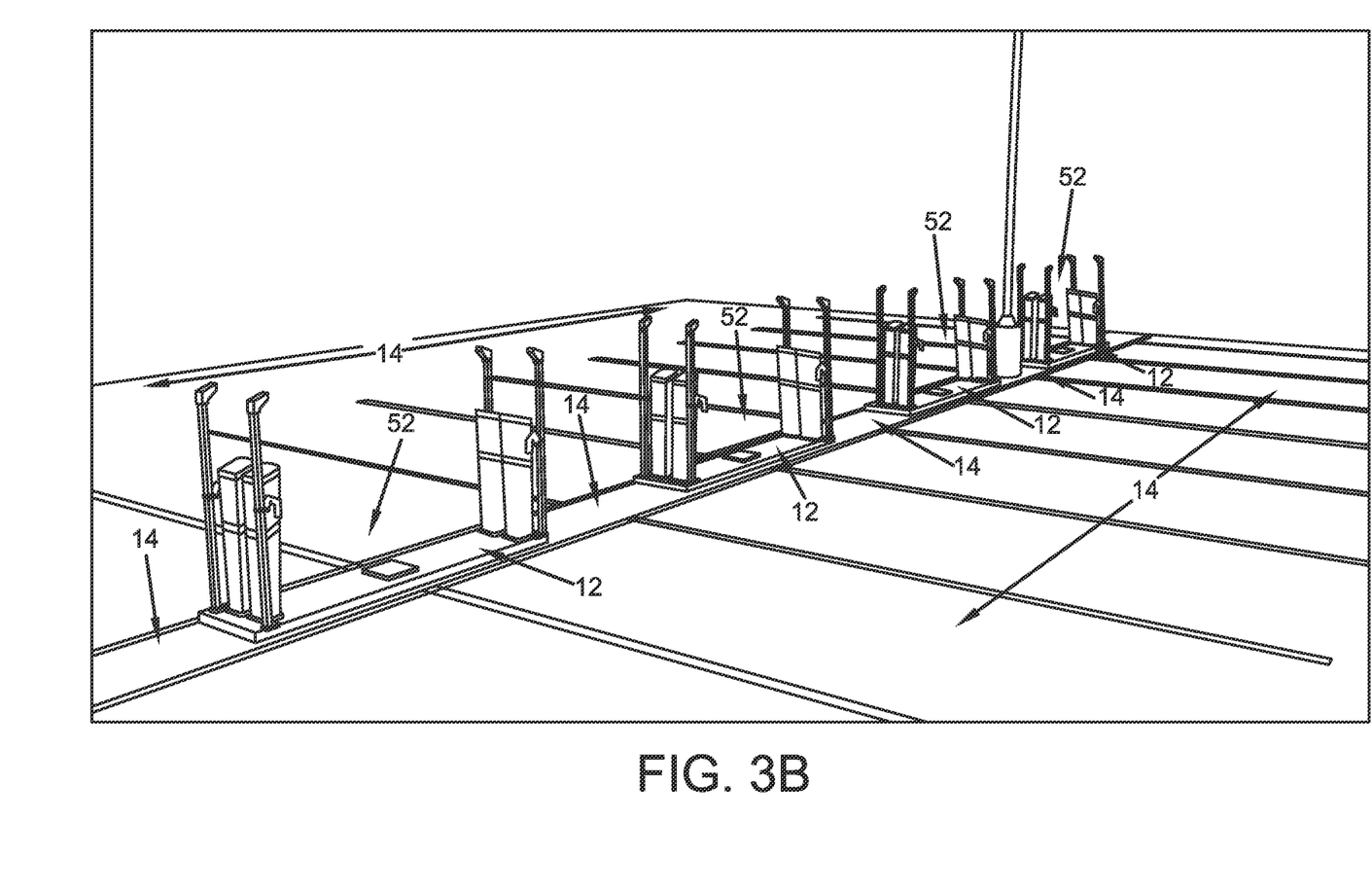

As additionally shown in the exemplary embodiment of FIGS. 1A, 1B, 1C and 1D, 2, 3A and 3B, the outer junction boxes 20a, 20b, 20c, 20d are preferably four outer junction boxes, each configured to provide a power connection and a communication connection to a respective one of four electrical charging dispensers 50a, 50b, 50c, 50d in an EV charging station 52. However, the present center pad 12 can be adapted to include any desired number of outer junction boxes and accompanying electrical charging dispensers without departing from the invention. In the depicted exemplary embodiment, a first pair of outer junction boxes 20a, 20b is located substantially proximate to the first end surface 34a of the center pad 12. A second pair of outer junction boxes 20c, 20d is located substantially proximate to the second end surface 34b. However, these outer junction boxes 20a, 20b, 20c, 20d can alternatively be arranged in any manner along the center pad 12 without departing from the invention.

As further shown in the exemplary embodiment of FIGS. 1A, 1B, 1C and 1D, 2 and 3, the horizontal surface 14 is preferably a vehicle parking lot for electric vehicles. The vehicle parking lot 14 preferably includes an opening 60 through which the power and communications conduit stub-ups 18 extend vertically upward above the plane of the parking lot 14. The power and communications conduit stub-ups 18 are connected to respective power and communications lines 62 placed underneath the vehicle parking lot 14. In this manner, the parking lot 14 can be formed with the lines 62 laid underground, after which concrete or asphalt pavement is laid atop the lines 62 to form the lot 14 with the stub-ups 18 extending upwardly above through the opening 60. After this, the center pad 12 is placed with the stub-ups 18 within the central junction box 16.

As also shown in FIGS. 1A, 1B, 1C and 1D, the center pad 16 is fashioned to further include first and second bores 64a, 64b extending between the top surface 30a and the bottom surface 30b of the center pad 12 at respective positions substantially proximate to the first and second end surfaces 34a, 34b. The first and second bores 64a, 64b each receive a reinforcing bar 66a, 66b (i.e., "rebar") for securing the center pad 12 to the parking lot 14 and stabilizing the pad 12 at each end.

As further shown in FIGS. 1A, 1B, 1C and 1D, a plurality of isolating plates 70a, 70b, 70c, 70d are each respectively set atop the plurality of outer junction boxes 20a, 20b, 20c, 20d to provide electrical and corrosion isolation between the center pad 12 and the respective plurality of electrical charging dispensers 50a, 50b, 50c, 50d. The isolating plates 70a, 70b, 70c, 70d are preferably formed of plastic, about ⅜-inch thick, and are found to be effective at forming a moisture and chemical barrier between the powder coated EV charging dispensers and the precast concrete center pad 12.

As additionally shown in FIGS. 1A, 1B, 1C and 1D, the central junction box 16 includes a removable cover plate 72 received atop the central junction box for sealing the central junction box 16 from the elements. The cover plate 72 is removable and enables personnel to access the junction box 16 and the connections for maintenance and upgrades. In the preferred embodiment, the cover plate 72 is ½ inch thick and 20"×20" square for covering a 16"×16" aperture, with a 2-inch border around the perimeter, and formed of plastic for providing electrical insulation. The central junction box 16 also includes a removable divider plate 74 for dividing the power conduit stub-up and associated power connections from the communications conduit stub-up and associated communications connections.

As further additionally shown in FIGS. 1A, 1B, 1C and 1D, the raceways 24a, 24b, 24c, 24d are preferably configured so that four raceways (two pairs of raceways 24b, 24d) for carrying power connections terminate in the central junction box 16 on one side of the divider plate 74 and another four raceways (two pairs of raceways 24a, 24c) for carrying communications connections terminate in the central junction box 16 on the other side of the divider plate 74. As shown, the pair of raceways 24a for carrying communications connections and the pair of raceways 24b for carrying power connections diverge and terminate respectively at outer junction boxes 20a, 20b near the first end surface 34a of the center pad 12. The pair of raceways 24c for carrying communications connections and the pair of raceways 24d for carrying power connections also diverge and terminate respectively at outer junction boxes 20c, 20d near the second end surface 34b of the center pad 12.

A method of standardized provisioning for an electrical vehicle charging station is now described herewith, utilizing the components described hereinabove. A center pad 12 is provided having a central junction box 16 and a plurality of outer junction boxes 20a, 20b, 20c, 20d formed therein, along with a plurality of raceways 24a, 24b, 24c, 24d extending through the center pad 12 from the central junction box 16 to each of the respective outer junction boxes 20a, 20b, 20c, 20d. As described hereinabove, the center pad 12 is preferably formed of concrete with the raceways 24a, 24b, 24c, 24d inserted during pouring of the concrete, and the junction boxes 16, 20a, 20b, 20c, 20d formed as voids in the mold.

The center pad 12 is placed on a horizontal surface 14 at a desired location such that the central junction box 16 is positioned atop power and communications conduit stub-ups 18 that extend vertically above the horizontal surface 14. As described hereinabove, the placing includes moving and lowering the center pad 12 into place with a plurality of removable eyelet anchors 36 retained in the precast concrete center pad 12. The eyelet anchors 36 are attached to cables connected to a winch system for lifting the center pad 12 and for subsequently moving and placing the precast concrete center pad 12 at the desired location. Upon removal, the threaded members that receive the eyelet anchors 36 can be filled with silicone sealer to prevent the entry of moisture, or can alternatively receive a removable plug in the event that the eyelet anchors 36 ever need to be reinserted for subsequent moving and repositioning of the center pad 12.

As described hereinabove, the horizontal surface 14 is preferably a vehicle parking lot for electric vehicles. Prior to placing the center pad 12, other operations are preferably performed of laying power and communications lines 62 underground that connect to the stub-ups 18 and configuring the power and communications stub-ups 18 to extend vertically upwardly above the plane of the parking lot 14. Afterwards, the vehicle parking lot 14 is formed atop the underground power and communications lines 62. An opening 60 is configured in the vehicle parking lot 14 through which the power and communications stub-ups 18 extend vertically.

After the step of placing the center pad 12, first and second reinforcing bars 66a, 66b are inserted into respective first and second bores 64a, 64b at first and second ends 34a, 34b of the center pad 12. These reinforcing bars 66a, 66b secure the center pad to the horizontal surface 14 and provide stabilizing of the pad 12 at each end.

After the center pad 12 is placed and secured, a plurality of power and communications connections 22a, 22b, 22c, 22d are established through the plurality of raceways 24a, 24b, 24c, 24d from the power and communications conduit stub-ups 18 in the central junction box 16 to a plurality of electrical charging dispensers 50a, 50b, 50c, 50d mounted atop each of the respective plurality of outer junction boxes 20a, 20b, 20c, 20d. The power and communications connections 22a, 22b, 22c, 22d can be established by first pulling suitable power and communications cable through the raceways 24a, 24b, 24c, 24d. Afterwards, the cables are connected to the suitable stub-ups 18 within the central junction box 16, along the suitable respective side of the divider plate 74. The cables are then connected at the other ends, within the outer junction boxes 20a, 20b, 20c, 20d, and then the power and communications connections 22a, 22b, 22c, 22d are connected to the electrical charging dispensers 50a, 50b, 50c, 50d.

During the establishing of the power and communications connections 22a, 22b, 22c, 22d, a plurality of isolating plates 70a, 70b, 70c, 70d are set atop the respective outer junction boxes 20a, 20b, 20c, 20d to provide electrical and corrosion isolation between the center pad 12 and the respective plurality of electrical charging dispensers 50a, 50b, 50c, 50d. The isolating plates 70a, 70b, 70c, 70d can be provided with holes that enable the connections 22a, 22b, 22c, 22d to pass from the respective outer junction boxes 20a, 20b, 20c, 20d to the electrical charging dispensers 50a, 50b, 50c, 50d.

Also during the establishing of the power and communications connections 22a, 22b, 22c, 22d, a cover plate 72 is placed atop the central junction box 16 for sealing the central junction box 16 from the elements. Also during or after the establishing of the power and communications connections 22a, 22b, 22c, 22d, a divider plate 74 is inserted into the central junction box 16 for dividing the power conduit stub-up and associated power connections from the communications conduit stub-up and associated communications connections, and thereby provide electrical isolation between the respective power and communications connections 22a, 22b, 22c, 22d.

Many benefits are obtainable from the present invention as described hereinabove. The present center pad 12 can be formed of precast concrete and shipped on a truck to a work site at such a time as the stub-ups 18 are installed and the parking lot 14 is finished. This is more advantageous than prior art methods that require concrete structures to be poured on site. An electrician can then install the suitable connections through a prefabricated structure in a standardized provisioning rather than a unique, ad hoc, tailor-made installation, thereby improving efficiency by saving time, labor and materials expense. Moreover, by providing a central junction box 16, a plurality of EV charging dispensers can be run from a single rough-in location rather than individual rough-in locations for each charging dispenser.

Moreover, the present design enables the charger and the dispensing operation to be elevated above the plane of the parking lot and any standing water, reducing potential electrical hazard. Further, the EV charging dispensers are oriented 90 degrees from the previous orientation, facing an instruction screen, so that that the driver is standing up and away from the vehicle instead of between the vehicle and the EV charging dispenser, further reducing potential electrical hazard.

The present standardized provisioning can be adapted for any sort of EV charging system, accommodating AC or DC electrical power, or levels 2 or 3 type systems. Further, the present system can be used with EV charging systems of any of the three major vendors, Siemens, Charge Point, or BTC, or can accommodate any different selection of these systems on the same rough-in configuration. In these ways the present invention improves efficiency, cost-effectiveness, timeliness, and flexibility in the installation of EV charging stations.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A standardized provisioning for an electrical vehicle charging station, comprising:
   a center pad configured to be moved and placed on a horizontal surface at a desired location;
   a central junction box formed in the center pad for receiving a power conduit stub-up and a communications conduit stub-up, wherein the power and communications conduit stub-ups extend vertically above the horizontal surface;
   a plurality of outer junction boxes formed in the center pad, each configured to provide a power connection and a communication connection to a respective plurality of electrical charging dispensers; and a plurality of raceways extending through the center pad from the central junction box to each of the respective outer junction boxes to provide passageways for the power and communications connections between the stub-ups and the plurality of electrical charging dispensers.

2. The standardized provisioning of claim 1, wherein the center pad is a rectangular pad and includes a top surface, a bottom surface, first and second side surfaces and first and second end surfaces.

3. The standardized provisioning of claim 2, wherein the central junction box and the plurality of outer junctions are rectangular apertures formed in the center pad extending between the top surface and the bottom surface.

4. The standardized provisioning of claim 3, wherein the rectangular apertures each include a drainage channel formed on the bottom surface extending between the first and second side surfaces.

5. The standardized provisioning of claim 2, wherein the center pad further comprises first and second bores extending between the top surface and the bottom surface at respective positions substantially proximate to the first and second end surfaces, wherein the first and second bores each receive a reinforcing bar for stabilizing and securing the center pad to the horizontal surface.

6. The standardized provisioning of claim 2, wherein the plurality of outer junction boxes comprises four outer junction boxes, each configured to provide a power connection and a communication connection to a respective one of four electrical charging dispensers, wherein a first pair of outer junction boxes is located substantially proximate to the first end surface and a second pair of outer junction boxes is located substantially proximate to the second end surface.

7. The standardized provisioning of claim 1, wherein the center pad is formed of precast concrete.

8. The standardized provisioning of claim 7, further comprising a plurality of removable eyelet anchors for moving and placing the precast concrete center pad.

9. The standardized provisioning of claim 1, wherein the horizontal surface is a vehicle parking lot for electric vehicles.

10. The standardized provisioning of claim 9, wherein the vehicle parking lot includes an opening through which the power and communications conduit stub-ups extend vertically, wherein the power and communications conduit stub-ups are connected to respective power and communications lines placed underneath the vehicle parking lot.

11. The standardized provisioning of claim 1, further comprising a plurality of isolating plates each respectively set atop the plurality of outer junction boxes to provide electrical and corrosion isolation between the center pad and the respective plurality of electrical charging dispensers.

12. The standardized provisioning of claim 1, further comprising a cover plate received atop the central junction box for sealing the central junction box from the elements.

13. The standardized provisioning of claim 1, wherein the central junction box further comprises a divider plate for dividing the power conduit stub-up and associated power connections from the communications conduit stub-up and associated communications connections.

14. A method of standardized provisioning for an electrical vehicle charging station, comprising:
providing a center pad having a central junction box and a plurality of outer junction boxes formed therein and a plurality of raceways extending through the center pad from the central junction box to each of the respective outer junction boxes;

placing the center pad on a horizontal surface at a desired location such that the central junction box is positioned atop power and communications conduit stub-ups that extend vertically above the horizontal surface;

establishing a plurality of power and communications connections through the plurality of raceways from the power and communications conduit stub-ups in the central junction box to a plurality of electrical charging dispensers mounted atop each of the respective plurality of outer junction boxes.

15. The method of claim 14, further comprising inserting first and second reinforcing bars into respective first and second bores at first and second ends of the center pad for stabilizing and securing the center pad to the horizontal surface.

16. The method of claim 14, wherein the center pad is formed of precast concrete and wherein the placing comprises moving and lowering the center pad into place with a plurality of removable eyelet anchors retained in the center pad.

17. The method of claim 14, wherein the horizontal surface includes a vehicle parking lot for electric vehicles, and further comprising, prior to placing the center pad, laying power and communications lines and configuring the power and communications stub-ups to extend vertically, further comprising forming the vehicle parking lot atop the power and communications lines and configuring an opening in the vehicle parking lot through which the power and communications stub-ups extend vertically.

18. The method of claim 14, further comprising setting a plurality of isolating plates respectively atop the plurality of outer junction boxes to provide electrical and corrosion isolation between the center pad and the respective plurality of electrical charging dispensers.

19. The method of claim 14, further comprising receiving a cover plate atop the central junction box for sealing the central junction box from the elements, and providing a divider plate in the central junction box for dividing the power conduit stub-up and associated power connections from the communications conduit stub-up and associated communications connections.

20. A standardized provisioning for an electrical vehicle charging station, comprising:
a precast concrete center pad configured to be moved and placed at a desired location in a vehicle parking lot for electric vehicles, wherein the center pad is a rectangular pad and includes a top surface, a bottom surface, first and second side surfaces and first and second end surfaces;

a power conduit stub-up and a communications conduit stub-up that extend vertically through an opening in the vehicle parking lot, wherein the power and communications conduit stub-ups are located at the desired location and are connected to lines placed underneath the vehicle parking lot;

a central junction box formed as a rectangular aperture in the center pad extending between the top surface and the bottom surface, for receiving the power and communications conduit stub-ups through the opening in the vehicle parking lot, wherein the central junction box includes a divider plate for dividing the power conduit stub-up and associated power connections from the communications conduit stub-up and associated communications connections, wherein a cover plate is received atop the central junction box for sealing the central junction box from the elements;

a plurality of outer junction boxes including a first set of rectangular apertures formed in the center pad and located substantially proximate to the first end surface and also including a second set of rectangular apertures formed in the center pad and located substantially proximate to the second end surface, wherein each of the outer junction boxes is configured to provide a power connection and a communication connection to a respective electrical charging dispenser;

a plurality of raceways extending through the center pad from the central junction box to each of the respective outer junction boxes to provide passageways for the power and communications connections between the stub-ups and the plurality of electrical charging dispensers; and a plurality of isolating plates each respectively set atop one of the outer junction boxes to provide electrical and corrosion isolation between the center pad and the respective electrical charging dispensers.

* * * * *